United States Patent
Yan et al.

(10) Patent No.: US 12,430,888 B1
(45) Date of Patent: Sep. 30, 2025

(54) METHOD AND APPARATUS FOR AUTOMATICALLY RECOGNIZING UNMANNED AERIAL VEHICLE, ELECTRONIC DEVICE, AND COMPUTER MEDIUM

(71) Applicants: Hainan Research Institute of Zhejiang University, Sanya (CN); Hainan Tongling Technology Co., Ltd, Sanya (CN); Zhejiang University, Hangzhou (CN)

(72) Inventors: Yunfeng Yan, Sanya (CN); Xiangyu Wen, Sanya (CN); Guangxin Zhi, Sanya (CN); Donglian Qi, Sanya (CN); Xiaotian Chen, Sanya (CN)

(73) Assignee: Hainan Research Institute of Zhejiang University, Sanya (CN)

( * ) Notice: Subject to any disclaimer, the term of this patent is extended or adjusted under 35 U.S.C. 154(b) by 0 days.

(21) Appl. No.: 19/218,719

(22) Filed: May 27, 2025

(30) Foreign Application Priority Data

Nov. 7, 2024 (CN) .......................... 202411578968.2

(51) Int. Cl.
*G06K 9/00* (2022.01)
*G06V 10/20* (2022.01)
(Continued)

(52) U.S. Cl.
CPC ............ *G06V 10/764* (2022.01); *G06V 10/25* (2022.01); *G06V 10/255* (2022.01); *G06V 10/30* (2022.01);
(Continued)

(58) Field of Classification Search
CPC ........ G06V 10/00; G06V 10/10; G06V 10/20; G06V 10/22; G06V 10/25; G06V 10/255;
(Continued)

(56) References Cited

U.S. PATENT DOCUMENTS 11,915,602 B2 * 2/2024 Ozturk ................ G06V 10/764
12,046,031 B2 * 7/2024 Dimond, Jr. ........... G06V 10/25
(Continued)

*Primary Examiner* — Eric Rush
(74) *Attorney, Agent, or Firm* — Bayramoglu Law Offices LLC

(57) ABSTRACT

A method and an apparatus for automatically recognizing an unmanned aerial vehicle, an electronic device, and a computer medium are provided. A specific implementation of the method includes: in response to determining that a radio detection device detects a radio signal, preprocessing the radio signal to generate preprocessed radio spectrum data; extracting radio signal features in the preprocessed radio spectrum data; inputting the radio signal features into a pre-trained unmanned aerial vehicle signal recognition model to obtain an unmanned aerial vehicle signal recognition result; in response to determining that the unmanned aerial vehicle signal recognition result represents an unmanned aerial vehicle signal, controlling a high-definition camera apparatus associated with the radio detection device to photograph an environmental video of a surrounding environment at a first time in real time; and generating unmanned aerial vehicle detection information corresponding to the first time according to a three-dimensional feature information group.

13 Claims, 3 Drawing Sheets

(51) Int. Cl.
*G06V 10/25* (2022.01)
*G06V 10/30* (2022.01)
*G06V 10/40* (2022.01)
*G06V 10/50* (2022.01)
*G06V 10/70* (2022.01)
*G06V 10/75* (2022.01)
*G06V 10/764* (2022.01)
*G06V 10/80* (2022.01)
*G06V 10/82* (2022.01)
*G06V 20/40* (2022.01)
*G06V 20/52* (2022.01)
*G06V 20/64* (2022.01)

(52) U.S. Cl.
CPC .............. *G06V 10/40* (2022.01); *G06V 10/50* (2022.01); *G06V 10/70* (2022.01); *G06V 10/75* (2022.01); *G06V 10/80* (2022.01); *G06V 10/82* (2022.01); *G06V 20/40* (2022.01); *G06V 20/52* (2022.01); *G06V 20/64* (2022.01); *G06T 2207/10016* (2013.01); *G06T 2207/20084* (2013.01); *G06V 2201/07* (2022.01); *G06V 2201/08* (2022.01)

(58) Field of Classification Search
CPC ........ G06V 10/30; G06V 10/40; G06V 10/42; G06V 10/44; G06V 10/454; G06V 10/46; G06V 10/50; G06V 10/70; G06V 10/72; G06V 10/74; G06V 10/75; G06V 10/761; G06V 10/764; G06V 10/772; G06V 10/80; G06V 10/803; G06V 10/806; G06V 10/82; G06V 20/40; G06V 20/41; G06V 20/46; G06V 20/52; G06V 20/64; G06V 20/70; G06V 2201/07; G06V 2201/08; G06T 7/70; G06T 2207/10004; G06T 2207/10016; G06T 2207/20021; G06T 2207/20081; G06T 2207/20084; G06T 2207/30248
USPC ....... 382/100, 103, 141, 153–157, 159, 160, 382/168, 170, 181, 190, 191, 195, 203, 382/209, 216–218, 224–228, 282, 291, 382/325

See application file for complete search history.

(56) References Cited

U.S. PATENT DOCUMENTS 12,154,282 B2 * 11/2024 Yachida .................... G06T 7/70
2025/0054265 A1 * 2/2025 Zhu ....................... G06V 10/764

* cited by examiner

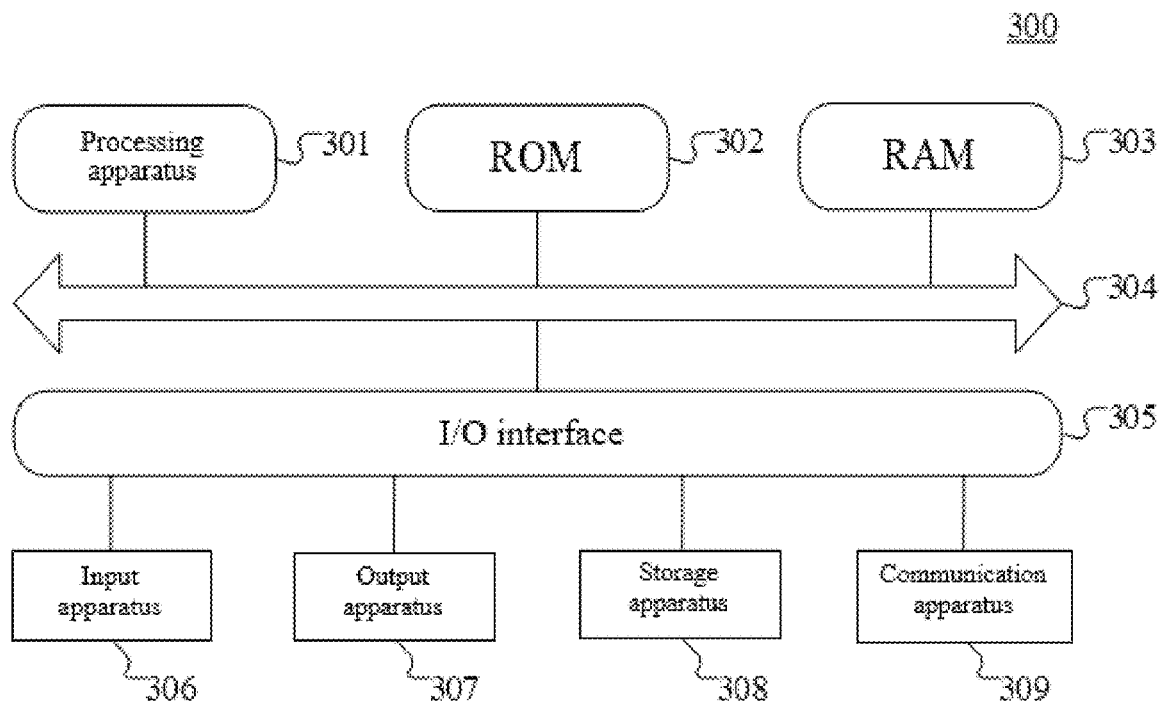

FIG. 3

```
# Radio signal recognition function
def radio_signal_recognition(signal):
    # Preprocess signal
    preprocessed_signal = preprocess_signal(signal)  #Custom signal preprocessing function
    # Convert signal to tensor and add batch and channel
    input_tensor = torch.tensor(preprocessed_signal).float().unsqueeze(0).unsqueeze(0)
    # Predict by NN model
    with torch.no_grad():
        output = cnn_model(input_tensor)
    # Output classification results
    prediction = torch.argmax(output, dim=1).item()
    return prediction
```

FIG. 4

METHOD AND APPARATUS FOR AUTOMATICALLY RECOGNIZING UNMANNED AERIAL VEHICLE, ELECTRONIC DEVICE, AND COMPUTER MEDIUM

CROSS REFERENCE TO THE RELATED APPLICATIONS

This application is based upon and claims priority to Chinese Patent Application No. 202411578968.2, filed on Nov. 7, 2024, the entire contents of which are incorporated herein by reference.

TECHNICAL FIELD

Embodiments of the present disclosure relate to the field of computers, and specifically, to a method and an apparatus for automatically recognizing an unmanned aerial vehicle, an electronic device, and a computer medium.

BACKGROUND

The unmanned aerial vehicle technology has developed rapidly in recent years, and the application scope of the unmanned aerial vehicle technology has continued to expand from military use to civilian and commercial fields. However, the popularity of unmanned aerial vehicles also brings security risks, including illegal intrusion of unmanned aerial vehicles into sensitive regions, threats to public safety, infringement of privacy, and potential terrorist activities. At present, a method commonly used to identify unmanned aerial vehicles is to recognize unmanned aerial vehicles with unmanned aerial vehicle signal frequency bands.

However, it is found in practice that the foregoing method often results in recognition errors when unmanned aerial vehicles are recognized only with unmanned aerial vehicle signal frequency bands.

The foregoing information disclosed in the background section is only for enhancement of understanding of the concept background of the present inventive, and therefore the above information may contain information that does not form the prior art that is already known to those of ordinary skill in the art.

SUMMARY

The contents of the present disclosure are used to introduce concepts in a simplified form, and these concepts are described in detail in the following detailed description. The contents of the present disclosure are not intended to identify the key features or essential features of the claimed technical solution, nor are the contents intended to be used to limit the scope of the claimed technical solution.

Some embodiments of the present disclosure provide a method and an apparatus for automatically recognizing an unmanned aerial vehicle, an electronic device, and a computer medium to address one or more of the technical problems mentioned in the background section above.

According to a first aspect, some embodiments of the present disclosure provide a method for automatically recognizing an unmanned aerial vehicle. The method includes: in response to determining that a radio detection device detects a radio signal, preprocessing the radio signal to generate preprocessed radio spectrum data; extracting radio signal features in the preprocessed radio spectrum data; inputting the radio signal features into a pre-trained unmanned aerial vehicle signal recognition model to obtain an unmanned aerial vehicle signal recognition result; in response to determining that the unmanned aerial vehicle signal recognition result represents an unmanned aerial vehicle signal, controlling a high-definition camera apparatus associated with the radio detection device to photograph an environmental video of a surrounding environment at a first time in real time; generating two-dimensional feature information corresponding to each frame of video image in the environmental video to obtain a two-dimensional feature information sequence; generating an unmanned aerial vehicle three-dimensional feature information group corresponding to an unmanned aerial vehicle detection object set at the first time according to a historical three-dimensional environment feature information group; generating a three-dimensional feature information group at the first time according to the unmanned aerial vehicle three-dimensional feature information group, a pre-constructed unmanned aerial vehicle query information group and the two-dimensional feature information sequence; and generating unmanned aerial vehicle detection information corresponding to the first time according to the three-dimensional feature information group.

According to a second aspect, some embodiments of the present disclosure provide an apparatus for automatically recognizing an unmanned aerial vehicle. The apparatus includes: a preprocessing unit, configured to preprocess a radio signal in response to determining that a radio detection device detects the radio signal to generate preprocessed radio spectrum data; an extraction unit, configured to extract radio signal features in the preprocessed radio spectrum data; an input unit, configured to input the radio signal features into a pre-trained unmanned aerial vehicle signal recognition model to obtain an unmanned aerial vehicle signal recognition result; a control unit, in response to determining that the unmanned aerial vehicle signal recognition result represents an unmanned aerial vehicle signal, configured to control a high-definition camera apparatus associated with the radio detection device to photograph an environmental video of a surrounding environment at a first time in real time; a first generation unit, configured to generate two-dimensional feature information corresponding to each frame of video image in the environmental video to obtain a two-dimensional feature information sequence; a second generation unit, configured to generate an unmanned aerial vehicle three-dimensional feature information group corresponding to an unmanned aerial vehicle detection object set at the first time according to a historical three-dimensional environment feature information group; a third generation unit, configured to generate a three-dimensional feature information group at the first time according to the unmanned aerial vehicle three-dimensional feature information group, a pre-constructed unmanned aerial vehicle query information group and the two-dimensional feature information sequence; and a fourth generation unit, configured to generate unmanned aerial vehicle detection information corresponding to the first time according to the three-dimensional feature information group.

According to a third aspect, some embodiments of the present disclosure provide an electronic device, which includes: one or more processors; and a storage device, having one or more programs stored thereon, wherein the one or more programs, when executed by the one or more processors, enable the one or more processors to implement the method described in any implementation of the first aspect.

According to a fourth aspect, some embodiments of the present disclosure provide a computer-readable medium, having a computer program stored thereon, wherein the program, when executed by a processor, implements the method described in any implementation of the first aspect.

The foregoing embodiments of the present disclosure have the following beneficial effects: the accuracy of recognizing an unmanned aerial vehicle is improved with the automatic unmanned aerial vehicle recognition method according to some embodiments of the present disclosure. Specifically, the reason for the recognition error is that the unmanned aerial vehicle is recognized only with the unmanned aerial vehicle signal frequency band. Based on this, according to the method for automatically recognizing an unmanned aerial vehicle of some embodiments of the present disclosure, in response to determining that a radio detection device detects a radio signal, the radio signal is preprocessed to generate preprocessed radio spectrum data. Radio signal features are extracted in the preprocessed radio spectrum data. Then, the radio signal features are inputted into a pre-trained unmanned aerial vehicle signal recognition model to obtain an unmanned aerial vehicle signal recognition result. Therefore, the spectrum features of the unmanned aerial vehicle may be recognized by detecting the radio signal of the unmanned aerial vehicle. The spectrum analysis technology is used to cover the 20M-8G frequency band to meet the requirements of complex scenarios. The deep learning algorithm is used to train and label unmanned aerial vehicle spectrograms for accurate recognition. Next, in response to determining that the unmanned aerial vehicle signal recognition result represents an unmanned aerial vehicle signal, a high-definition camera apparatus associated with the radio detection device is controlled to photograph an environmental video of a surrounding environment at a first time in real time. Two-dimensional feature information corresponding to each frame of video image in the environmental video is generated to obtain a two-dimensional feature information sequence. Then, an unmanned aerial vehicle three-dimensional feature information group corresponding to an unmanned aerial vehicle detection object set at the first time is generated according to a historical three-dimensional environment feature information group. Therefore, whether there are unmanned aerial vehicles in the surrounding airspace may be further determined with image recognition and three-dimensional recognition technologies. Finally, a three-dimensional feature information group at the first time is generated according to the unmanned aerial vehicle three-dimensional feature information group, a pre-constructed unmanned aerial vehicle query information group and the two-dimensional feature information sequence. Unmanned aerial vehicle detection information corresponding to the first time is generated according to the three-dimensional feature information group. Therefore, unmanned aerial vehicle recognition may be performed from two perspectives: unmanned aerial vehicle signal and environmental image, thereby improving the accuracy of unmanned aerial vehicle recognition.

BRIEF DESCRIPTION OF THE DRAWINGS

The above and other features, advantages and aspects of the embodiments of the present disclosure become more apparent with reference to the following detailed description in conjunction with the accompanying drawings. Throughout the accompanying drawings, the same or similar reference numerals refer to the same or similar elements. It should be understood that the accompanying drawings are schematic and that components and elements are not necessarily drawn to scale.

FIG. 3 is a schematic structural diagram of an electronic device suitable for implementing some embodiments of the present disclosure; and FIG. 4 is a screenshot of an internal exemplary code for unmanned aerial vehicle signal recognition in a part of a method for automatically recognizing an unmanned aerial vehicle according to the present disclosure.

DETAILED DESCRIPTION OF THE EMBODIMENTS

Hereinafter, embodiments of the present disclosure are described in detail with reference to the accompanying drawings. Although some embodiments of the present disclosure are shown in the accompanying drawings, it should be understood that the present disclosure may be implemented in various forms and should not be construed as limited to the embodiments set forth herein. Rather, these embodiments are provided to provide a thorough and complete understanding of the present disclosure. It should be understood that the accompanying drawings and embodiments of the present disclosure are only used for illustrative purposes and are not used to limit the protection scope of the present disclosure.

It should also be noted that, for the convenience of description, only the parts related to the present invention are shown in the accompanying drawings. The embodiments and features in the embodiments of the present disclosure can be combined with each other without conflict.

It should be noted that the concepts such as "first" and "second" mentioned in the present disclosure are only used to distinguish different devices, modules or units, and are not used to limit the order or interdependence of the functions performed by these devices, modules or units.

It should be noted that the modifications of "a" and "a plurality of" mentioned in the present disclosure are illustrative rather than restrictive, and those skilled in the art should understand that unless otherwise clearly indicated in the context, it should be understood as "one or more".

The names of the messages or information exchanged between a plurality of apparatuses in the embodiments of the present disclosure are only used for illustrative purposes and are not used to limit the scope of these messages or information.

The present disclosure is described in detail below with reference to the accompanying drawings and the embodiments.

Figure 1:
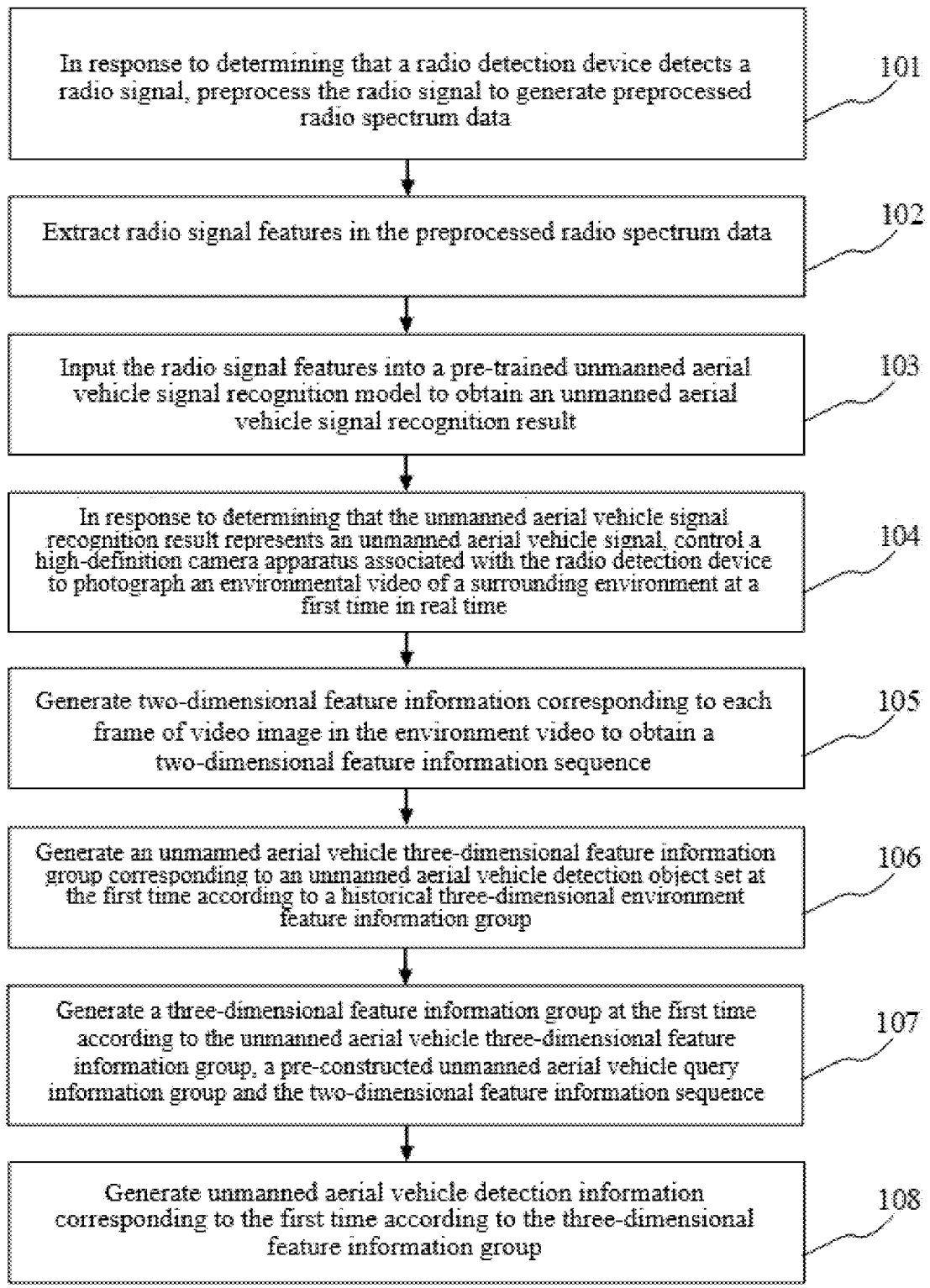
FIG. 1 is a flowchart of some embodiments of a method for automatically recognizing an unmanned aerial vehicle according to the present disclosure.

FIG. 1 is a flowchart of some embodiments of a method for automatically recognizing an unmanned aerial vehicle according to the present disclosure. which shows a flowchart 100 of some embodiments of a method for automatically recognizing an unmanned aerial vehicle according to the present disclosure. The method for automatically recognizing an unmanned aerial vehicle includes the following steps:

Step 101. In response to determining that a radio detection device detects a radio signal, the radio signal is preprocessed to generate preprocessed radio spectrum data.

In some embodiments, an execution subject (e.g., a computing device) of the method for automatically recognizing an unmanned aerial vehicle may, in response to determining that a radio detection device detects a radio signal, preprocess the radio signal to generate preprocessed radio spectrum data. The radio detection device may be a device for detecting an unmanned aerial vehicle radio signal. For example, the radio detection device may be a radio detector or a wireless signal detector. For example, the preprocessing of the radio signal may include: denoising, filtering and normalization.

Step 102. Radio signal features in the preprocessed radio spectrum data are extracted.

In some embodiments, the execution subject may extract radio signal features in the preprocessed radio spectrum data. For example, features in the preprocessed radio spectrum data, such as frequency, amplitude, phase, and modulation mode, may be extracted and converted into feature vectors. The execution subject may extract the radio signal feature in the preprocessed radio spectrum data by a preset radio spectrum feature extraction method. The radio spectrum feature extraction method may include: cyclic spectrum feature extraction, time domain feature extraction (multi-layer perceptron (MLP), and convolutional neural network (CNN)). The radio signal features in the preprocessed radio spectrum data may also be extracted by Fourier transform or fast Fourier transform (FFT).

Step 103: The radio signal features are inputted into a pre-trained unmanned aerial vehicle signal recognition model to obtain an unmanned aerial vehicle signal recognition result.

In some embodiments, the execution subject may input the radio signal features into a pre-trained unmanned aerial vehicle signal recognition model to obtain an unmanned aerial vehicle signal recognition result. The unmanned aerial vehicle signal recognition model may be a pre-trained neural network model that takes the radio signal features as input and takes the unmanned aerial vehicle signal recognition results as output. For example, the unmanned aerial vehicle signal recognition model may be a pre-trained CNN model. FIG. 4 exemplarily shows a screenshot of part codes related to unmanned aerial vehicle signal recognition. The part codes related to the unmanned aerial vehicle signal recognition illustrated in FIG. 4 is merely a screenshot of internal exemplary codes.

The unmanned aerial vehicle signal recognition model may be trained by the following steps:

Step I. An unmanned aerial vehicle radio signal spectrum group set is obtained. An unmanned aerial vehicle radio signal spectrum group in the unmanned aerial vehicle radio signal spectrum group set corresponds to an unmanned aerial vehicle radio signal type. For example, radio spectrum signals of a large number of different types of unmanned aerial vehicles are collected, covering a plurality of frequency bands (20M-8G). When data are collected, it is necessary to ensure the diversity of different unmanned aerial vehicle types, distances, and environmental conditions.

Step II. Unmanned aerial vehicle radio signal spectra in the unmanned aerial vehicle radio signal spectrum group set is labeled to obtain a labeled unmanned aerial vehicle radio signal spectrum group set serving as an unmanned aerial vehicle radio signal spectrum sample group set. For example, The collected unmanned aerial vehicle radio signal spectrum is labeled, including labels such as unmanned aerial vehicle model and signal type, to form a labeled data set.

Step III. An initial unmanned aerial vehicle signal recognition model is determined. The initial unmanned aerial vehicle signal recognition model includes: an initial signal feature extraction network, an initial multi-level signal feature hybrid autoencoder network, and an initial signal recognition network. For example, the initial signal feature extraction network may be a convolutional neural network (CNN), a recurrent neural network (RNN), a long short-term memory (LSTM) network, or the like.

The step III may include:

Sub-step I. Determining an initial signal feature extraction network.

Sub-step II. Determining an initial multi-level signal feature hybrid autoencoder network. The initial multi-level signal feature hybrid autoencoder network includes: an initial encoder network (encoder) and an initial decoder network (decoder), the initial encoder network includes: an initial signal feature decoupling network (including an autoencoder network and an LSTM network) and an initial signal feature fusion network (variational autoencoder (VAE)), the initial signal feature decoupling network includes: an initial static signal feature decoupling network and an initial dynamic signal feature decoupling network, and the initial signal feature fusion network includes: an initial fusion network and an initial reparameterization network. The initial static signal feature decoupling network may be an autoencoder model. The initial dynamic signal feature decoupling network may be a long short-term memory (LSTM) model. The initial fusion network may be a feature pyramid network (FPN) or a self-attention mechanism network. The initial reparameterization network may include: dynamic re-parameterization (DyRep) and asymmetric convolution net (ACNet).

Sub-step III. Determining an initial signal recognition network. Firstly, a signal perception classification network is determined. For example, the signal perception classification network may be a Kolmogorov-Arnold Network (KAN)-based multi-level perceptual classifier. Secondly, the signal perception classification network is initialized to generate an initial signal perception classification network. The signal perception classification network may be initialized by a Kaiming initialization algorithm to generate an initial signal perception classification network. Then, noise processing is performed on the initial signal perception classification network to generate a noise signal perception classification network. The initial signal perception classification network may be subjected to noise processing by a Gaussian noise algorithm to generate a noise signal perception classification network. The noise signal perception classification network is subjected to parameter regularization to generate a signal perception classification regularization network. The noise signal perception classification network may be subjected to parameter regularization by an L1 regularization (L1 norm regularization) algorithm to generate a signal perception classification regularization network. Finally, the signal perception classification regularization network is subjected to activation adjustment to generate the initial signal recognition network. The signal perception classification regularization network may be subjected to activation adjustment by an activation function so as to generate the initial signal recognition network.

Sub-step IV. Performing fusion processing on the initial signal feature extraction network, the initial multi-level signal feature hybrid autoencoder network and the initial signal recognition network to generate the initial unmanned aerial vehicle signal recognition model.

Step IV. For each unmanned aerial vehicle radio signal spectrum sample group in the unmanned aerial vehicle radio signal spectrum sample group set, a target unmanned aerial vehicle radio signal spectrum sample is selected from the unmanned aerial vehicle radio signal spectrum sample group. An unmanned aerial vehicle radio signal spectrum sample may be randomly selected from the unmanned aerial vehicle radio signal spectrum sample group as a target unmanned aerial vehicle radio signal spectrum sample.

Step V. An initial unmanned aerial vehicle signal recognition model is trained according to the target unmanned aerial vehicle radio signal spectrum samples to obtain a trained unmanned aerial vehicle signal recognition model.

The step V may include:

Sub-step I. For each target unmanned aerial vehicle radio signal spectrum sample in the target unmanned aerial vehicle radio signal spectrum samples, performing the following training steps:

1. inputting a sample unmanned aerial vehicle radio signal spectrum included by the target unmanned aerial vehicle radio signal spectrum sample into an initial signal feature extraction network to obtain initial unmanned aerial vehicle radio signal feature information;
2. inputting the initial unmanned aerial vehicle radio signal feature information into an initial multi-level signal feature hybrid autoencoder network to obtain initial multi-level unmanned aerial vehicle radio signal feature information;
3. inputting the initial multi-level unmanned aerial vehicle radio signal feature information into an initial signal recognition network to obtain an initial unmanned aerial vehicle radio signal recognition result; and
4. determining a signal loss value between the initial unmanned aerial vehicle radio signal recognition result and a sample label included in the target unmanned aerial vehicle radio signal spectrum sample based on a preset loss function. The loss function may be: mean square error loss (MSE Loss) function, cross-entropy loss function, mean absolute error (MAE) function.

Sub-step II. In response to determining that a sum of signal loss values is less than or equal to a preset loss value, determining the initial unmanned aerial vehicle signal recognition model as the trained unmanned aerial vehicle signal recognition model.

Therefore, the present invention constructs a multi-level signal feature hybrid autoencoder network, which can comprehensively capture the multi-level information in the signal and enhance the efficiency and accuracy of the autoencoder in feature disentanglement. In addition, a multi-layer signal recognition network is constructed, which may help the model capture the complex nonlinear relationships in signal data and improve the accuracy of signal recognition.

Step 104. In response to determining that the unmanned aerial vehicle signal recognition result represents an unmanned aerial vehicle signal, a high-definition camera apparatus associated with the radio detection device is controlled to photograph an environmental video of a surrounding environment at a first time in real time.

In some embodiments, the execution subject may, in response to determining that the unmanned aerial vehicle signal recognition result represents an unmanned aerial vehicle signal, control a high-definition camera apparatus associated with the radio detection device to photograph an environmental video of a surrounding environment at a first time in real time. The high-definition camera apparatus may refer to a high-definition camera mounted around a radio detection device and used to monitor the surrounding low-altitude area. The high-definition camera apparatus may perform 360-degree rotating photographing and has 3D photography function. The first time may refer to a time period of a preset duration after the time point when the unmanned aerial vehicle signal recognition result is determined to represent the unmanned aerial vehicle signal is reached. The preset duration may be 1 minute.

Step 105. Two-dimensional feature information corresponding to each frame of video image in the environmental video is generated to obtain a two-dimensional feature information sequence.

In some embodiments, the execution subject may generate two-dimensional feature information corresponding to each frame of video image in the environmental video to obtain a two-dimensional feature information sequence. The two-dimensional feature information may represent the feature information in the two-dimensional (2D) space corresponding to the video image. The two-dimensional feature information may be information in a vector form that represents image semantics corresponding to the video image.

For example, the execution subject may input each video image to a convolutional neural network model to generate two-dimensional feature information, resulting in a two-dimensional feature information group.

In practice, the execution subject may generate the two-dimensional feature information corresponding to each frame of video image in the environmental video by the following steps:

Step I. For each frame of video image, the following steps are performed:

Firstly, the video image is divided according to a preset number of divided regions to obtain a divided region image group. The preset number of divided regions may represent a number of divided region images into which the video image is divided. For example, the preset number of divided regions may be 6. Here, the specific value of the preset number of divided regions is not limited. The foregoing divided region images may represent images divided from the foregoing video image.

Secondly, for each divided region image in the divided region image group, the following steps are iterated:

1. The histogram information of the foregoing divided region images is determined. The histogram information may represent a histogram of the divided region images. In practice, the execution subject may determine the histogram information of the divided region images with the cv2.calcHist ( ) function in the OpenCV library.
2. The foregoing histogram information is equalized to obtain equalized histogram information.
3. The equalized histogram information is processed by grayscale value mapping to obtain the grayscale level corresponding to the foregoing divided region images.
4. According to the grayscale level, the number information of the divided region images and the clipping factor information, the threshold information corresponding to the divided region images is determined. The threshold information may represent a histogram clipping threshold. The number information of the foregoing divided region images may represent the number of pixels within the divided region images. In practice, first, the execution subject may determine a ratio of the number of pixels within the divided region image to the grayscale level as a target ratio. Then, the product of the target ratio and the clipping factor information is determined as threshold information.

5. According to the threshold information, the divided region image is updated to obtain an updated divided region image. The execution subject may perform a clipping process on the divided region image according to the threshold information by using a threshold segmentation algorithm to obtain a clipped divided region image. Then, an interpolation algorithm may be used to perform pixel allocation processing on each pixel in the clipped divided region image, and the divided region image after pixel allocation processing is obtained as an updated divided region image.

6. The updated divided region image is subjected to histogram equalization to obtain a histogram equalized updated divided region image as the divided region image.

7. The number of iterations is updated, and the updated number of iterations is obtained as the number of iterations.

Thirdly, the obtained divided region images are fused, and the obtained divided region images after fusion processing are merged into fused image information. The execution subject may perform fusion processing on the obtained divided region images by using an image fusion algorithm to obtain the fused divided region images as fused image information. For example, the image fusion algorithm may be a spatial domain fusion algorithm.

Fourthly, in response to determining that the number of iterations is less than the preset number of iterations, the fused image information is used as the wound surface injection image information, and the above division step is performed again.

Fifthly, in response to determining that the number of iterations is greater than or equal to the preset number of iterations, the fused image information is determined as an enhanced video image.

Step II. Two-dimensional feature information corresponding to each enhanced video image is generated to obtain a two-dimensional feature information sequence. For example, the enhanced video image may be inputted to a pre-trained two-dimensional image feature extraction model to generate two-dimensional feature information. The two-dimensional image feature extraction model may be a neural network model that extracts image feature information in the two-dimensional image. In practice, the two-dimensional image feature extraction model may be a multi-layer series of convolutional layers. The two-dimensional feature information may represent the semantic content of image features in enhanced video images.

Step 106. An unmanned aerial vehicle three-dimensional feature information group corresponding to an unmanned aerial vehicle detection object set at the first time is generated according to a historical three-dimensional environment feature information group.

In some embodiments, the execution subject may generating an unmanned aerial vehicle three-dimensional feature information group corresponding to an unmanned aerial vehicle detection object set at the first time according to a historical three-dimensional environment feature information group. The historical three-dimensional environment feature information group may represent detection content information of the unmanned aerial vehicle detection objects at the historical time. In practice, each unmanned aerial vehicle detection object in the unmanned aerial vehicle detection objects in a one-to-one correspondence with historical three-dimensional environment feature information in the historical three-dimensional environment feature information group. The historical three-dimensional feature information may be feature information of a corresponding unmanned aerial vehicle detection object in a corresponding three-dimensional (3D) space at a historical time. The historical three-dimensional feature information may be information in a vector form. At the historical time, the unmanned aerial vehicle has a corresponding flight position and posture, and a corresponding three-dimensional space coordinate system may be established for the current high-definition camera apparatus. That is, the historical three-dimensional feature information may be information representing the detection features corresponding to the unmanned aerial vehicle detection object in the corresponding three-dimensional space coordinate system at the historical time. The unmanned aerial vehicle detection objects at the historical time have corresponding detection confidences, that is, each historical three-dimensional feature information has a corresponding confidence, which represents the accuracy of the historical three-dimensional feature information in representing the detection features corresponding to the unmanned aerial vehicle detection object in the corresponding three-dimensional coordinate system. The detection confidence may be a value between 0 and 1. The higher the value, the higher the accuracy of the corresponding historical three-dimensional feature information. The unmanned aerial vehicle detection object set is the unmanned aerial vehicle detection objects detected at the historical time. The unmanned aerial vehicle three-dimensional feature information group may represent feature information of the unmanned aerial vehicle detection objects in the unmanned aerial vehicle detection object set in the corresponding three-dimensional coordinate system at the first time. The unmanned aerial vehicle three-dimensional feature information may be feature information in a vector form. The three-dimensional coordinate system may be a three-dimensional coordinate system established based on the high-definition camera apparatus at the first time. For example, first, a first image set corresponding to the first time and a second image set corresponding to the historical time are obtained. A model is generated from the first image set and the second image set by using position transformation information, and the change information of the objects between the first image set and the second image set is determined. In practice, the position transformation information generation model may be a neural network model that generates position transformation information. In practice, the position transformation information generation model may include: a position detection model and a position mapping model. The position detection model may be a neural network model that generates position information in an image. The position mapping model may be a mapping model that generates position transformation between position information between two identical unmanned aerial vehicle objects. The position mapping model may be a multi-layer series of fully connected layers. Finally, the historical three-dimensional feature information group is mapped according to the change information to generate a three-dimensional feature information group corresponding to the unmanned aerial vehicle detection object set at the first time as unmanned aerial vehicle three-dimensional feature information group.

Step 107. A three-dimensional feature information group at the first time is generated according to the unmanned aerial vehicle three-dimensional feature information group, a pre-constructed unmanned aerial vehicle query information group and the two-dimensional feature information sequence.

In some embodiments, the execution subject may generate a three-dimensional feature information group at the first time according to the unmanned aerial vehicle three-dimensional feature information group, a pre-constructed unmanned aerial vehicle query information group and the two-dimensional feature information sequence. The unmanned aerial vehicle query information in the unmanned aerial vehicle query information group corresponds to a pre-estimated unmanned aerial vehicle in the pre-estimated unmanned aerial vehicles at the first time. The estimated unmanned aerial vehicles may be unmanned aerial vehicles that are estimated to appear at the first time. The unmanned aerial vehicle query information may be information representing unmanned aerial vehicle feature information in a vector form. The unmanned aerial vehicle feature information may represent feature information of relevant features of the unmanned aerial vehicle. For example, the relevant features may include: unmanned aerial vehicle position and unmanned aerial vehicle posture.

In practice, the execution subject may generate a three-dimensional feature information group at the first time by the following steps:

Step I. The unmanned aerial vehicle three-dimensional feature information group is combined with the unmanned aerial vehicle query information group to generate a combined information group.

Step II. The combined information group is inputted to a first attention mechanism model to generate attention mechanism information. The first attention mechanism model may be a pre-trained attention mechanism-based neural network model. In practice, the first attention mechanism model may be a Transformer model.

Step III. Three-dimensional spatial dimension conversion is performed on the two-dimensional feature information sequence to generate three-dimensional feature information serving as candidate three-dimensional feature information. The two-dimensional feature information sequence may be subjected to three-dimensional spatial dimension conversion by using a pre-obtained three-dimensional feature conversion model to generate three-dimensional feature information as candidate three-dimensional feature information.

Step IV. The candidate three-dimensional feature information and the attention mechanism information are inputted into a second attention mechanism model to generate the three-dimensional feature information group. The second attention mechanism model may be a pre-trained attention mechanism-based neural network model. For example, the second attention mechanism model may be a Transformer model.

Step 108. Unmanned aerial vehicle detection information corresponding to the first time is generated according to the three-dimensional feature information group.

In some embodiments, the execution subject may generate unmanned aerial vehicle detection information corresponding to the first time according to the three-dimensional feature information group.

In practice, the execution subject may generate the unmanned aerial vehicle detection information corresponding to the first time by the following steps:

Step I. Each frame of video image in the environmental video is denoised to generate a denoised video image and obtain a denoised video image sequence.

Step II. Target detection is performed on the denoised video image sequence by a pre-trained target detection model to generate a target detection image group. The target detection image includes a target bounding box. The target detection model may be a pre-trained neural network model with the denoised video image as input and the target detection image as output. For example, the target detection model may be a YOLOv5 model.

Step III. For each target detection image in the target detection image group, feature extraction is performed on an image region in the target bounding box in the target detection image to obtain target image region features. Feature extraction: Feature extraction is performed on the image region within the target selection frame, and a convolutional neural network (CNN) is used to extract the spatial features of the unmanned aerial vehicle, such as shape, texture, and color.

Step IV. Each target image region feature is classified by a pre-trained target classification detection model to generate a feature classification detection result and obtain a feature classification detection result group. The target classification detection model may be a pre-trained neural network model that takes target image region features as input and takes feature classification detection results as output. For example, the target classification detection model may be a 3D CNN model or CNN+LSTM model. The feature classification detection result may represent the type of the unmanned aerial vehicle.

Step V. Unmanned aerial vehicle detection information corresponding to the first time is generated according to the three-dimensional feature information group and the feature classification detection result group. For example, first, the execution subject may determine a similarity between the historical three-dimensional feature information in the historical three-dimensional feature information group and the three-dimensional feature information group, and obtain a similarity set. Then, historical three-dimensional feature information with the corresponding similarity greater than a preset similarity is selected from the historical three-dimensional feature information group as target three-dimensional feature information to obtain at least one piece of target three-dimensional feature information. At least one target three-dimensional feature information is spliced with corresponding three-dimensional feature information having a similarity association relationship to generate a spliced three-dimensional feature information group. Finally, the spliced three-dimensional feature information group is inputted into a regression model and a classification model to output regression information and classification information. The regression information may be position information of a corresponding unmanned aerial vehicle. The classification information may be confidence of a corresponding unmanned aerial vehicle. Then, the regression information and the classification information are integrated with the corresponding unmanned aerial vehicle information to generate first unmanned aerial vehicle detection information. Finally, the first unmanned aerial vehicle detection information and the feature classification detection result are combined into unmanned aerial vehicle detection information.

Figure 2:
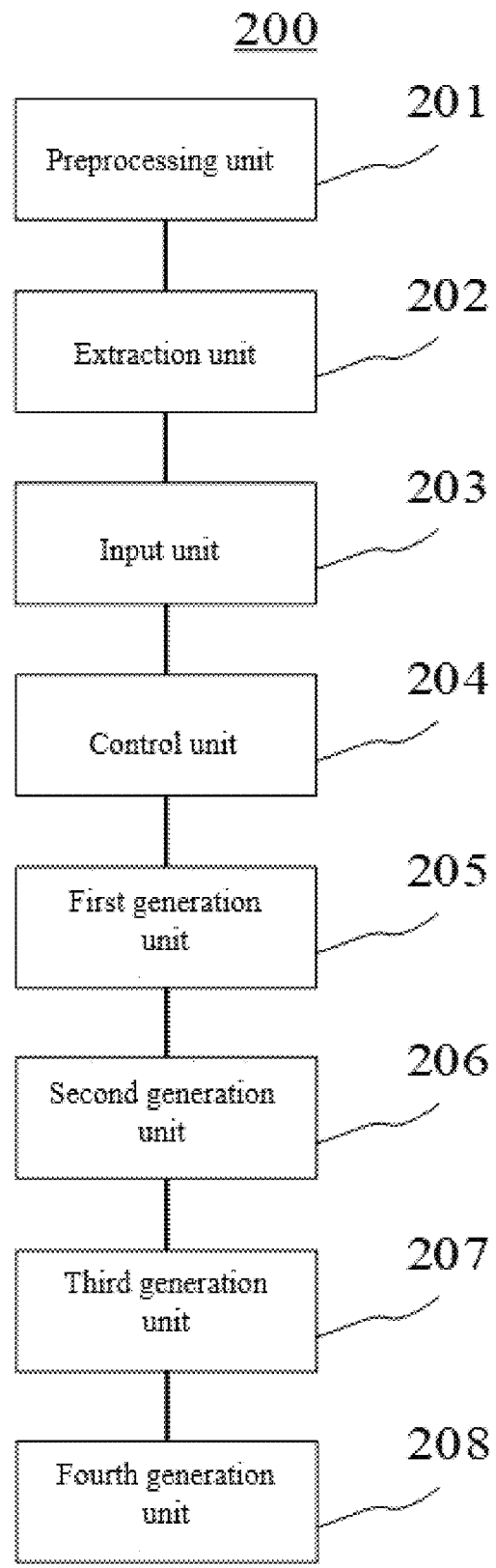
FIG. 2 is a schematic structural diagram of some embodiments of an apparatus for automatically recognizing an unmanned aerial vehicle according to the present disclosure.

Further, referring to FIG. 2, as an implementation of the methods shown in the above figures, the present disclosure provides some embodiments of an apparatus for automatically recognizing an unmanned aerial vehicle. These apparatus embodiments correspond to the method embodiments shown in FIG. 1, and may be applied in various electronic devices.

As shown in FIG. 2, the apparatus 200 for automatically recognizing an unmanned aerial vehicle of some embodiments includes: a preprocessing unit 201, an extraction unit 202, an input unit 203, a control unit 204, a first generation unit 205, a second generation unit 206, a third generation unit 207, and a fourth generation unit 208. The preprocessing unit 201 is configured to preprocess a radio signal in response to determining that a radio detection device detects the radio signal to generate preprocessed radio spectrum data; the extraction unit 202 is configured to extract radio signal features in the preprocessed radio spectrum data; the input unit 203 is configured to input the radio signal features into a pre-trained unmanned aerial vehicle signal recognition model to obtain an unmanned aerial vehicle signal recognition result; the control unit 204, in response to determining that the unmanned aerial vehicle signal recognition result represents an unmanned aerial vehicle signal, is configured to control a high-definition camera apparatus associated with the radio detection device to photograph an environmental video of a surrounding environment at a first time in real time; the first generation unit 205 is configured to generate two-dimensional feature information corresponding to each frame of video image in the environmental video to obtain a two-dimensional feature information sequence; the second generation unit 206 is configured to generate an unmanned aerial vehicle three-dimensional feature information group corresponding to an unmanned aerial vehicle detection object set at the first time according to a historical three-dimensional environment feature information group; the third generation unit 207 is configured to generate a three-dimensional feature information group at the first time according to the unmanned aerial vehicle three-dimensional feature information group, a pre-constructed unmanned aerial vehicle query information group and the two-dimensional feature information sequence; and the fourth generation unit 208 is configured to generate unmanned aerial vehicle detection information corresponding to the first time according to the three-dimensional feature information group.

It may be understood that the units recorded in the apparatus 200 for automatically recognizing an unmanned aerial vehicle correspond to the steps in the method described with reference to FIG. 1. Therefore, the operations, features and beneficial effects described above for the method are also applicable to the apparatus 200 for automatically recognizing an unmanned aerial vehicle and the units included therein. Details are not described herein again.

Referring to FIG. 3, shown is a block diagram of an electronic device 300 (e.g., a computing device) suitable for implementing some embodiments of the present disclosure. The electronic devices in some embodiments of the present disclosure may include, but are not limited to, mobile terminals such as a mobile phone, a laptop computer, a digital broadcast receiver, a personal digital assistant (PDA), a tablet computer (PAD) and a portable multimedia player (PMP), and fixed terminals such as a digital TV and a desktop computer. The electronic device shown in FIG. 3 is only an example, and should not bring any limitation to the functions and the scope of use of the embodiments of the present disclosure.

As shown in FIG. 3, the electronic device 300 may include a processing apparatus (e.g., a central processing unit, and a graphics processing unit) 301, which may perform various appropriate actions and processes according to a program stored in a read-only memory (ROM) 302 or a program loaded from a storage apparatus 308 to a random access memory (RAM) 303. In the RAM 303, various programs and data necessary for the operation of the electronic device 300 are stored. The processing apparatus 301, the ROM 302, and the RAM 303 are connected to each other via a bus 304. An input/output (I/O) interface 305 is also connected to the bus 304.

Generally, the following apparatuses may be connected to the I/O interface 305: an input apparatus 306 including, for example, a touch screen, a touchpad, a keyboard, a mouse, a camera, a microphone, an accelerometer, and a gyroscope; an output apparatus 307 including, for example, a liquid crystal display (LCD), a speaker, and a vibrator; a storage device 308 including, for example, a magnetic tape and a hard disk; and a communication apparatus 309. The communication apparatus 309 may allow the electronic device 300 to communicate with other devices wirelessly or by wire to exchange data. Although FIG. 3 shows an electronic device 300 having various apparatuses, it should be understood that it is not required to implement or possess all of the devices shown. More or fewer apparatuses may alternatively be implemented or provided. Each block shown in FIG. 3 may represent one apparatus, or may represent a plurality of apparatuses as required.

In particular, according to some embodiments of the present disclosure, the processes described above with reference to the flowcharts may be implemented as a computer software program. For example, some embodiments of the present disclosure include a computer program product including a computer program embodied on a computer-readable medium, and the computer program contains program code for performing the method illustrated by the flowchart. In some such embodiments, the computer program may be downloaded and installed from a network via the communication apparatus 309, or installed from the storage apparatus 308, or installed from the ROM 302. When the computer program is executed by the processing apparatus 301, the above functions defined in the methods of some embodiments of the present disclosure are performed.

It should be noted that the computer-readable medium described in some embodiments of the present disclosure may be a computer-readable signal medium or a computer-readable storage medium or any combination of the two. The computer-readable storage medium may be but is not limited to an electric, magnetic, optical, electromagnetic, infrared, or semiconductor system, apparatus, or device, or any combination thereof. More specific examples of the computer-readable storage medium may include, but are not limited to, an electrical connection having one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof. In some embodiments of the present disclosure, the computer-readable storage medium may be any tangible medium including or storing a program that may be used by an instruction execution system, apparatus, or device, or be used in combination with an instruction execution system, apparatus, or device. In some embodiments of the present disclosure, the computer-readable signal medium may include a data signal propagated in a baseband or propagated as part of a carrier, where the data signal carries computer-readable program code. Such a propagated data signal may take a variety of forms, including but not limited to an electromagnetic signal, an optical signal, or any suitable combination thereof. The computer-readable signal medium may alternatively be any computer-readable medium other than the computer-readable storage medium. The computer-readable signal medium may send, propagate, or transmit the program used by the instruction execution system, apparatus, or device, or used in combination with the instruction execution system, apparatus, or device. The program code included in the computer-readable medium may be transmitted by using any suitable medium, including but not limited to Wi-Fi, a wire, an optical cable, radio frequency (RF), and the like, or any suitable combination thereof.

In some embodiments, the client and server may communicate using any currently known or future developed network protocol such as a hypertext transfer protocol (HTTP), and may be interconnected with any form or medium of digital data communication (e.g., a communication network). Examples of communication networks include a local area network ("LAN"), a wide area network ("WAN"), an internetwork (e.g., the Internet), and a peer-to-peer network (e.g., an ad hoc peer-to-peer network), as well as any currently known or later developed network.

The computer-readable medium may be included in the electronic device, or may exist independently without being installed in the electronic device. The computer-readable medium carries one or more programs. When the one or more programs are executed by the electronic device, the electronic device, in response to determining that a radio detection device detects a radio signal, preprocesses the radio signal to generate preprocessed radio spectrum data; extracts radio signal features in the preprocessed radio spectrum data; inputs the radio signal features into a pre-trained unmanned aerial vehicle signal recognition model to obtain an unmanned aerial vehicle signal recognition result; in response to determining that the unmanned aerial vehicle signal recognition result represents an unmanned aerial vehicle signal, controls a high-definition camera apparatus associated with the radio detection device to photograph an environmental video of a surrounding environment at a first time in real time; generates two-dimensional feature information corresponding to each frame of video image in the environmental video to obtain a two-dimensional feature information sequence; generates an unmanned aerial vehicle three-dimensional feature information group corresponding to an unmanned aerial vehicle detection object set at the first time according to a historical three-dimensional environment feature information group; generates a three-dimensional feature information group at the first time according to the unmanned aerial vehicle three-dimensional feature information group, a pre-constructed unmanned aerial vehicle query information group and the two-dimensional feature information sequence; and generates unmanned aerial vehicle detection information corresponding to the first time according to the three-dimensional feature information group.

Computer program code for performing the operations of some embodiments of the present disclosure may be written in one or more programming languages, or a combination thereof. The programming languages include an object-oriented programming language, such as Java, Smalltalk, and C++, and also include a conventional procedural programming language, such as a "C" language or a similar programming language. The program code may be executed entirely on a user computer, or some may be executed on a user computer as a separate software package, or some may be executed on a user computer while some is executed on a remote computer, or the code may be entirely executed on a remote computer or a server. When a remote computer is involved, the remote computer may be connected to a user computer by using any type of network, including a local area network (LAN) or a wide area network (WAN), or may be connected to an external computer (for example, connected by using an Internet service provider through the Internet).

The flowchart and block diagrams in the accompanying drawings show the system architecture, function, and operation of possible implementations of systems, methods, and computer program products according to various embodiments of the present disclosure. In this regard, each block in the flowcharts or block diagrams may represent a module, a program segment, or a part of a code, and the module, the program segment, or the part of the code includes one or more executable instructions for implementing a specified logical function. It should also be noted that, in some alternative implementations, functions marked in the blocks may also occur in a sequence different from that marked in the accompanying drawings. For example, two blocks shown in succession may, in fact, be actually executed substantially in parallel, or sometimes may be executed in a reverse order, depending on a function involved. It should also be noted that each block of the block diagrams and/or flowcharts, and combinations of blocks in the block diagrams and/or flowcharts, can be implemented by special purpose hardware-based systems that perform the specified functions or operations, or combinations of special purpose hardware and computer instructions.

The units described in some embodiments of the present disclosure may be implemented by software or by hardware. The described units may also be provided in a processor, for example, may be described as: a processor includes: a preprocessing unit, an extraction unit, an input unit, a control unit, a first generation unit, a second generation unit, a third generation unit and a fourth generation unit. The names of these units do not, in some cases, constitute limitations on the units. For example, the preprocessing unit may also be described as "a unit that, in response to determining that a radio detection device detects a radio signal, preprocesses the radio signal to generate preprocessed radio spectrum data".

The functions described above herein may be performed at least in part by one or more hardware logic components. For example, without limitation, exemplary types of hardware logic components that may be used include: a field programmable gate arrays (FPGA), an application specific integrated circuit (ASIC), an application specific standard product (ASSP), a system on chip (SOC), a complex programmable logic devices (CPLD), and the like.

The above description is only an illustration of some preferred embodiments of the present disclosure and the technical principles used. It should appreciated by those skilled in the art that the scope of the present invention in the embodiments of the present disclosure is not limited to the specific combinations of the foregoing features, and other embodiments in which the foregoing features or equivalent features thereof are combined without departing from the spirit of the present invention are also encompassed. For example, the foregoing features are replaced with (but not limited to) technical features with similar functions disclosed in the embodiments of the present disclosure to form a technical solution.

What is claimed is:

1. A method for automatically recognizing an unmanned aerial vehicle, comprising:
    in response to determining that a radio detection device detects a radio signal, preprocessing the radio signal to generate preprocessed radio spectrum data;
    extracting radio signal features in the preprocessed radio spectrum data;
    inputting the radio signal features into a pre-trained unmanned aerial vehicle signal recognition model to obtain an unmanned aerial vehicle signal recognition result;
    in response to determining that the unmanned aerial vehicle signal recognition result represents an unmanned aerial vehicle signal, controlling a high-definition camera apparatus associated with the radio detection device to photograph an environmental video of a surrounding environment at a first time in real time;

generating two-dimensional feature information corresponding to each frame of video image in the environmental video to obtain a two-dimensional feature information sequence;

generating an unmanned aerial vehicle three-dimensional feature information group corresponding to an unmanned aerial vehicle detection object set at the first time according to a historical three-dimensional environment feature information group;

generating a three-dimensional feature information group at the first time according to the unmanned aerial vehicle three-dimensional feature information group, a pre-constructed unmanned aerial vehicle query information group and the two-dimensional feature information sequence; and generating unmanned aerial vehicle detection information corresponding to the first time according to the three-dimensional feature information group;

wherein the step of generating the three-dimensional feature information group at the first time according to the unmanned aerial vehicle three-dimensional feature information group, the pre-constructed unmanned aerial vehicle query information group and the two-dimensional feature information sequence comprises:

combining the unmanned aerial vehicle three-dimensional feature information group with the pre-constructed unmanned aerial vehicle query information group to generate a combined information group;

inputting the combined information group to a first attention mechanism model to generate attention mechanism information;

performing three-dimensional spatial dimension conversion on the two-dimensional feature information sequence to generate three-dimensional feature information serving as candidate three-dimensional feature information; and inputting the candidate three-dimensional feature information and the attention mechanism information into a second attention mechanism model to generate the three-dimensional feature information group; and wherein the step of generating the unmanned aerial vehicle detection information corresponding to the first time according to the three-dimensional feature information group comprises:

denoising each frame of video image in the environmental video to generate a denoised video image and obtain a denoised video image sequence;

performing target detection on the denoised video image sequence by a pre-trained target detection model to generate a target detection image group, wherein each target detection image of the target detection image group comprises a target bounding box;

for each target detection image in the target detection image group, performing feature extraction on an image region in the target bounding box in the target detection image to obtain target image region features;

classifying each of the target image region features by a pre-trained target classification detection model to generate a feature classification detection result and obtain a feature classification detection result group; and generating the unmanned aerial vehicle detection information corresponding to the first time according to the three-dimensional feature information group and the feature classification detection result group.

2. The method according to claim 1, wherein before the step of inputting the radio signal features into the pre-trained unmanned aerial vehicle signal recognition model to obtain the unmanned aerial vehicle signal recognition result, the method further comprises:

obtaining an unmanned aerial vehicle radio signal spectrum group set, wherein an unmanned aerial vehicle radio signal spectrum group in the unmanned aerial vehicle radio signal spectrum group set corresponds to an unmanned aerial vehicle radio signal type;

labeling unmanned aerial vehicle radio signal spectra in the unmanned aerial vehicle radio signal spectrum group set to obtain a labeled unmanned aerial vehicle radio signal spectrum group set serving as an unmanned aerial vehicle radio signal spectrum sample group set;

determining an initial unmanned aerial vehicle signal recognition model, wherein the initial unmanned aerial vehicle signal recognition model comprises: an initial signal feature extraction network, an initial multi-level signal feature hybrid autoencoder network and an initial signal recognition network;

for each unmanned aerial vehicle radio signal spectrum sample group in the unmanned aerial vehicle radio signal spectrum sample group set, selecting target unmanned aerial vehicle radio signal spectrum samples from the unmanned aerial vehicle radio signal spectrum sample group; and training the initial unmanned aerial vehicle signal recognition model according to the target unmanned aerial vehicle radio signal spectrum samples to obtain the pre-trained unmanned aerial vehicle signal recognition model.

3. The method according to claim 2, wherein the step of training the initial unmanned aerial vehicle signal recognition model according to the target unmanned aerial vehicle radio signal spectrum samples to obtain the pre-trained unmanned aerial vehicle signal recognition model comprises:

for each target unmanned aerial vehicle radio signal spectrum sample in the target unmanned aerial vehicle radio signal spectrum samples, perform the following training steps:

inputting a sample unmanned aerial vehicle radio signal spectrum comprised by the target unmanned aerial vehicle radio signal spectrum sample into the initial signal feature extraction network to obtain initial unmanned aerial vehicle radio signal feature information;

inputting the initial unmanned aerial vehicle radio signal feature information into the initial multi-level signal feature hybrid autoencoder network to obtain initial multi-level unmanned aerial vehicle radio signal feature information;

inputting the initial multi-level unmanned aerial vehicle radio signal feature information into the initial signal recognition network to obtain an initial unmanned aerial vehicle radio signal recognition result;

determining a signal loss value between the initial unmanned aerial vehicle radio signal recognition result and a sample label comprised in the target unmanned aerial vehicle radio signal spectrum sample based on a preset loss function; and in response to determining that a sum of signal loss values is less than or equal to a preset loss value, determining the initial unmanned aerial vehicle signal recognition model as the pre-trained unmanned aerial vehicle signal recognition model.

4. The method according to claim 2, wherein the step of determining the initial unmanned aerial vehicle signal recognition model comprises:

determining the initial signal feature extraction network;

determining the initial multi-level signal feature hybrid autoencoder network, wherein the initial multi-level signal feature hybrid autoencoder network comprises: an initial encoder network and an initial decoder network, the initial encoder network comprises: an initial signal feature decoupling network and an initial signal feature fusion network, the initial signal feature decoupling network comprises: an initial static signal feature decoupling network and an initial dynamic signal feature decoupling network, and the initial signal feature fusion network comprises: an initial fusion network and an initial reparameterization network;

determining the initial signal recognition network; and performing fusion processing on the initial signal feature extraction network, the initial multi-level signal feature hybrid autoencoder network and the initial signal recognition network to generate the initial unmanned aerial vehicle signal recognition model.

5. An apparatus for automatically recognizing an unmanned aerial vehicle, applied to the method according to claim 1, comprising:

a preprocessing unit, configured to preprocess the radio signal in response to determining that the radio detection device detects the radio signal to generate the preprocessed radio spectrum data;

an extraction unit, configured to extract the radio signal features in the preprocessed radio spectrum data;

an input unit, configured to input the radio signal features into the pre-trained unmanned aerial vehicle signal recognition model to obtain the unmanned aerial vehicle signal recognition result;

a control unit, in response to determining that the unmanned aerial vehicle signal recognition result represents the unmanned aerial vehicle signal, configured to control the high-definition camera apparatus associated with the radio detection device to photograph the environmental video of the surrounding environment at the first time in real time;

a first generation unit, configured to generate the two-dimensional feature information corresponding to each frame of video image in the environmental video to obtain the two-dimensional feature information sequence;

a second generation unit, configured to generate the unmanned aerial vehicle three-dimensional feature information group corresponding to the unmanned aerial vehicle detection object set at the first time according to the historical three-dimensional environment feature information group;

a third generation unit, configured to generate the three-dimensional feature information group at the first time according to the unmanned aerial vehicle three-dimensional feature information group, the pre-constructed unmanned aerial vehicle query information group and the two-dimensional feature information sequence; and a fourth generation unit, configured to generate the unmanned aerial vehicle detection information corresponding to the first time according to the three-dimensional feature information group.

6. An electronic device, comprising:

one or more processors; and a storage device, wherein one or more programs are stored on the storage device;

wherein the one or more programs, when executed by the one or more processors, allow the one or more processors to implement the method according to claim 1.

7. The electronic device according to claim 6, wherein in the method, before the step of inputting the radio signal features into the pre-trained unmanned aerial vehicle signal recognition model to obtain the unmanned aerial vehicle signal recognition result, the method further comprises:

obtaining an unmanned aerial vehicle radio signal spectrum group set, wherein an unmanned aerial vehicle radio signal spectrum group in the unmanned aerial vehicle radio signal spectrum group set corresponds to an unmanned aerial vehicle radio signal type;

labeling unmanned aerial vehicle radio signal spectra in the unmanned aerial vehicle radio signal spectrum group set to obtain a labeled unmanned aerial vehicle radio signal spectrum group set serving as an unmanned aerial vehicle radio signal spectrum sample group set;

determining an initial unmanned aerial vehicle signal recognition model, wherein the initial unmanned aerial vehicle signal recognition model comprises: an initial signal feature extraction network, an initial multi-level signal feature hybrid autoencoder network and an initial signal recognition network;

for each unmanned aerial vehicle radio signal spectrum sample group in the unmanned aerial vehicle radio signal spectrum sample group set, selecting target unmanned aerial vehicle radio signal spectrum samples from the unmanned aerial vehicle radio signal spectrum sample group; and training the initial unmanned aerial vehicle signal recognition model according to the target unmanned aerial vehicle radio signal spectrum samples to obtain the pre-trained unmanned aerial vehicle signal recognition model.

8. The electronic device according to claim 7, wherein in the method, the step of training the initial unmanned aerial vehicle signal recognition model according to the target unmanned aerial vehicle radio signal spectrum samples to obtain the pre-trained unmanned aerial vehicle signal recognition model comprises:

for each target unmanned aerial vehicle radio signal spectrum sample in the target unmanned aerial vehicle radio signal spectrum samples, perform the following training steps:

inputting a sample unmanned aerial vehicle radio signal spectrum comprised by the target unmanned aerial vehicle radio signal spectrum sample into the initial signal feature extraction network to obtain initial unmanned aerial vehicle radio signal feature information;

inputting the initial unmanned aerial vehicle radio signal feature information into the initial multi-level signal feature hybrid autoencoder network to obtain initial multi-level unmanned aerial vehicle radio signal feature information;

inputting the initial multi-level unmanned aerial vehicle radio signal feature information into the initial signal recognition network to obtain an initial unmanned aerial vehicle radio signal recognition result;

determining a signal loss value between the initial unmanned aerial vehicle radio signal recognition result and a sample label comprised in the target unmanned aerial vehicle radio signal spectrum sample based on a preset loss function; and in response to determining that a sum of signal loss values is less than or equal to a preset loss value, determining the initial unmanned aerial vehicle signal recognition model as the pre-trained unmanned aerial vehicle signal recognition model.

9. The electronic device according to claim 7, wherein in the method, the step of determining the initial unmanned aerial vehicle signal recognition model comprises:

determining the initial signal feature extraction network;

determining the initial multi-level signal feature hybrid autoencoder network, wherein the initial multi-level signal feature hybrid autoencoder network comprises: an initial encoder network and an initial decoder network, the initial encoder network comprises: an initial signal feature decoupling network and an initial signal feature fusion network, the initial signal feature decoupling network comprises: an initial static signal feature decoupling network and an initial dynamic signal feature decoupling network, and the initial signal feature fusion network comprises: an initial fusion network and an initial reparameterization network;

determining the initial signal recognition network; and performing fusion processing on the initial signal feature extraction network, the initial multi-level signal feature hybrid autoencoder network and the initial signal recognition network to generate the initial unmanned aerial vehicle signal recognition model.

10. A non-transitory computer-readable medium, wherein a computer program is stored on the non-transitory computer-readable medium, and the computer program, when executed by a processor, implements the method according to claim 1.

11. The non-transitory computer-readable medium according to claim 10, wherein in the method, before the step of inputting the radio signal features into the pre-trained unmanned aerial vehicle signal recognition model to obtain the unmanned aerial vehicle signal recognition result, the method further comprises:

obtaining an unmanned aerial vehicle radio signal spectrum group set, wherein an unmanned aerial vehicle radio signal spectrum group in the unmanned aerial vehicle radio signal spectrum group set corresponds to an unmanned aerial vehicle radio signal type;

labeling unmanned aerial vehicle radio signal spectra in the unmanned aerial vehicle radio signal spectrum group set to obtain a labeled unmanned aerial vehicle radio signal spectrum group set serving as an unmanned aerial vehicle radio signal spectrum sample group set;

determining an initial unmanned aerial vehicle signal recognition model, wherein the initial unmanned aerial vehicle signal recognition model comprises: an initial signal feature extraction network, an initial multi-level signal feature hybrid autoencoder network and an initial signal recognition network;

for each unmanned aerial vehicle radio signal spectrum sample group in the unmanned aerial vehicle radio signal spectrum sample group set, selecting target unmanned aerial vehicle radio signal spectrum samples from the unmanned aerial vehicle radio signal spectrum sample group; and training the initial unmanned aerial vehicle signal recognition model according to the target unmanned aerial vehicle radio signal spectrum samples to obtain the pre-trained unmanned aerial vehicle signal recognition model.

12. The non-transitory computer-readable medium according to claim 11, wherein in the method, the step of training the initial unmanned aerial vehicle signal recognition model according to the target unmanned aerial vehicle radio signal spectrum samples to obtain the pre-trained unmanned aerial vehicle signal recognition model comprises:

for each target unmanned aerial vehicle radio signal spectrum sample in the target unmanned aerial vehicle radio signal spectrum samples, perform the following training steps:

inputting a sample unmanned aerial vehicle radio signal spectrum comprised by the target unmanned aerial vehicle radio signal spectrum sample into the initial signal feature extraction network to obtain initial unmanned aerial vehicle radio signal feature information;

inputting the initial unmanned aerial vehicle radio signal feature information into the initial multi-level signal feature hybrid autoencoder network to obtain initial multi-level unmanned aerial vehicle radio signal feature information;

inputting the initial multi-level unmanned aerial vehicle radio signal feature information into the initial signal recognition network to obtain an initial unmanned aerial vehicle radio signal recognition result;

determining a signal loss value between the initial unmanned aerial vehicle radio signal recognition result and a sample label comprised in the target unmanned aerial vehicle radio signal spectrum sample based on a preset loss function; and in response to determining that a sum of signal loss values is less than or equal to a preset loss value, determining the initial unmanned aerial vehicle signal recognition model as the pre-trained unmanned aerial vehicle signal recognition model.

13. The non-transitory computer-readable medium according to claim 11, wherein in the method, the step of determining the initial unmanned aerial vehicle signal recognition model comprises:

determining the initial signal feature extraction network;

determining the initial multi-level signal feature hybrid autoencoder network, wherein the initial multi-level signal feature hybrid autoencoder network comprises: an initial encoder network and an initial decoder network, the initial encoder network comprises: an initial signal feature decoupling network and an initial signal feature fusion network, the initial signal feature decoupling network comprises: an initial static signal feature decoupling network and an initial dynamic signal feature decoupling network, and the initial signal feature fusion network comprises: an initial fusion network and an initial reparameterization network;

determining the initial signal recognition network; and performing fusion processing on the initial signal feature extraction network, the initial multi-level signal feature hybrid autoencoder network and the initial signal recognition network to generate the initial unmanned aerial vehicle signal recognition model.

* * * * *

UNITED STATES PATENT AND TRADEMARK OFFICE
CERTIFICATE OF CORRECTION

| | | |
|---|---|---|
| PATENT NO. | : 12,430,888 B1 | Page 1 of 1 |
| APPLICATION NO. | : 19/218719 | |
| DATED | : September 30, 2025 | |
| INVENTOR(S) | : Yunfeng Yan | |

It is certified that error appears in the above-identified patent and that said Letters Patent is hereby corrected as shown below:

On the Title Page

Item (73) Assignee Should read as follows:
Hainan Research Institute of
Zhejiang University, Sanya (CN);
Hainan Tongling Technology Co., Ltd,
Sanya (CN); Zhejiang University,
Hangzhou (CN)

Signed and Sealed this
Eleventh Day of November, 2025

John A. Squires
*Director of the United States Patent and Trademark Office*